US 8,584,219 B1
Nov. 12, 2013

(12) United States Patent
Toole et al.

(54) RISK ADJUSTED, MULTIFACTOR AUTHENTICATION

(71) Applicants: Robert C. Toole, Hingham, MA (US); Jonathan Hromi, Watertown, MA (US); John McDonough, Nahant, MA (US); Hadley Rupert Stern, West Newton, MA (US); Seth Warren Brooks, South Easton, MA (US)

(72) Inventors: Robert C. Toole, Hingham, MA (US); Jonathan Hromi, Watertown, MA (US); John McDonough, Nahant, MA (US); Hadley Rupert Stern, West Newton, MA (US); Seth Warren Brooks, South Easton, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/670,698

(22) Filed: Nov. 7, 2012

(51) Int. Cl.
*H04L 29/06* (2006.01)

(52) U.S. Cl.
USPC .................................. 726/7; 726/25

(58) Field of Classification Search
USPC ................... 726/25, 5, 7, 19, 2; 713/182, 183
See application file for complete search history.

(56) References Cited

U.S. PATENT DOCUMENTS

2008/0086759 A1* 4/2008 Colson .............................. 726/2
2011/0314549 A1* 12/2011 Song et al. ...................... 726/25

* cited by examiner

*Primary Examiner* — Edward Zee
(74) *Attorney, Agent, or Firm* — Fish & Richardson P.C.

(57) ABSTRACT

A computer-implemented method comprising: receiving, from a device used by a user, a request to access a resource hosted by a computer system; identifying, by the computer system, a level of risk associated with the user requesting access to the resource; adjusting, by the computer system an authentication standard for access to the resource, adjusting based on the identified level of risk; determining values for authentication factors used in authenticating the user's access to the resource; applying weights to the values for the authentication factors; and determining, based on a comparison of the weighted values to the adjusted authentication standard, whether the user is authorized to access the resource.

20 Claims, 6 Drawing Sheets

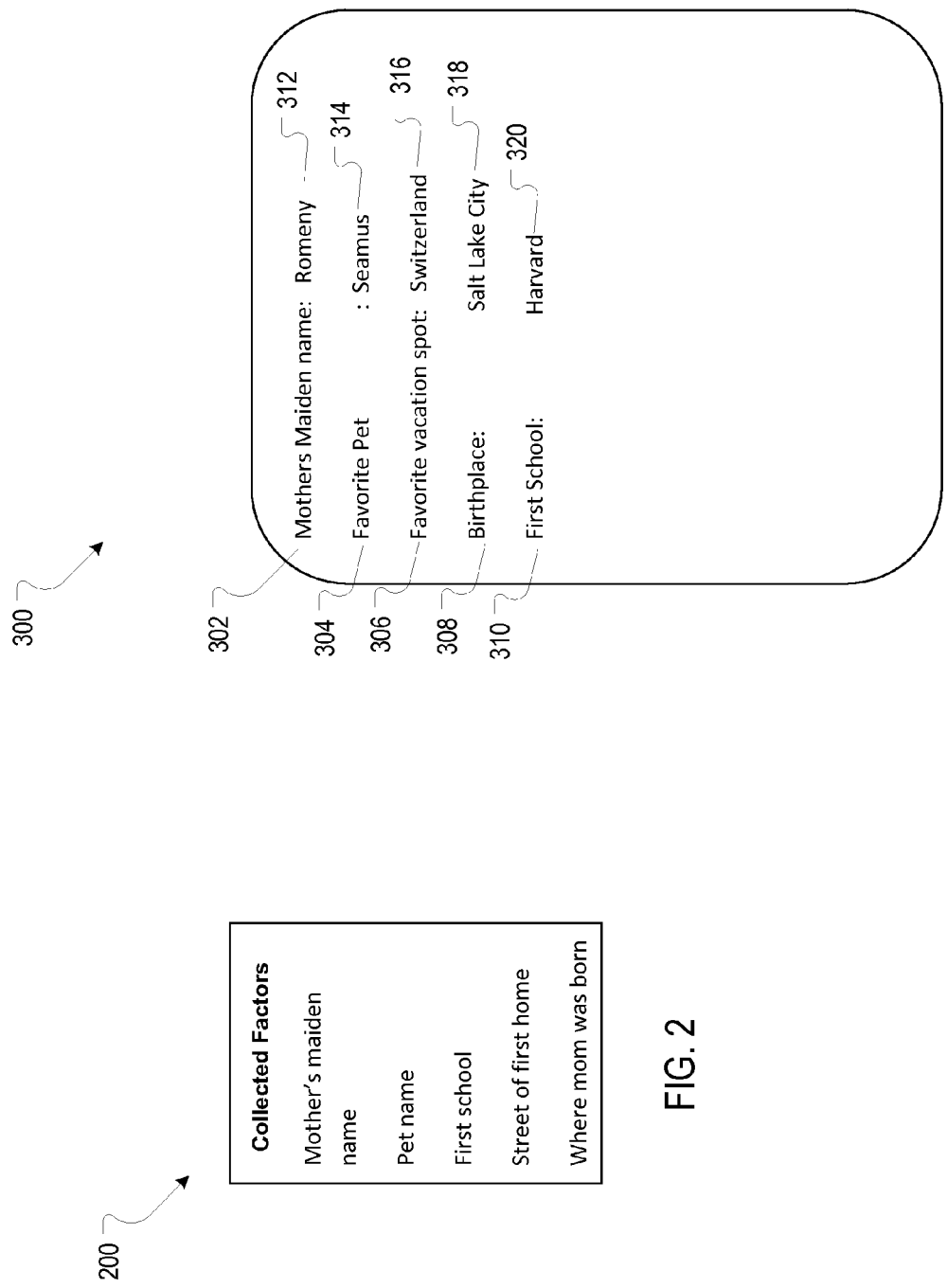

RISK ADJUSTED, MULTIFACTOR AUTHENTICATION

BACKGROUND

This invention generally relates to computer-based authentication.

A system such as a computer-based system authenticates a user of the system by prompting the user to provide answers to security questions. To increase security in accessing the system, the system prompts the user to answer more security questions or to answer security questions with more complex answers.

SUMMARY

In general, in one aspect, a computer-implemented comprises: receiving, from a device used by a user, a request to access a resource hosted by a computer system; identifying, by the computer system, a level of risk associated with the user requesting access to the resource; adjusting, by the computer system an authentication standard for access to the resource, adjusting based on the identified level of risk; determining values for authentication factors used in authenticating the user's access to the resource; is applying weights to the values for the authentication factors; and determining, based on a comparison of the weighted values to the adjusted authentication standard, whether the user is authorized to access the resource. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. Implementations may include one or more of the following features. In some implementations, the method includes receiving, from the device used by the user, information specifying a selection of the authentication factors. In other implementations, the method includes receiving, from the device used by the user, information specifying the weights to be applied to the authentication factors. In still other implementations, the authentication factor comprises one or more of a collected factor, a real-time factor, and an observed factor.

In some implementations, one of the authentication factors is an observed factor, and the method further comprises: transmitting, to the device, a request for information specifying a current value of the observed factor; and receiving, from the device, the information specifying a current value of the observed factor. In still other implementations, the method includes retrieving, from a data repository, information is collected based on the user's prior accessing of the resource; identifying, in the retrieved information, a value for the observed factor; and comparing the identified value of the observed factor to the current value of the observed factor; wherein identifying the level of risk associated with the user requesting access to the resource comprises: identifying, based on comparing the identified value of the observed factor to the current value of the observed factor, the level of risk associated with the user requesting access to the resource. In other implementations, one of the authentication factors is an observed factor, wherein the observed factor promotes an increase in a level of authentication, relative to a level of authentication provided without the observed factor, that is independent of user input.

BRIEF DESCRIPTION OF THE FIGURES

FIGS. 3 and 6 are examples of graphical user interfaces presented to users of the multifactor authentication system.

FIGS. 2, 4-5 are examples of authentication factors.

DETAILED DESCRIPTION

Figure 1:
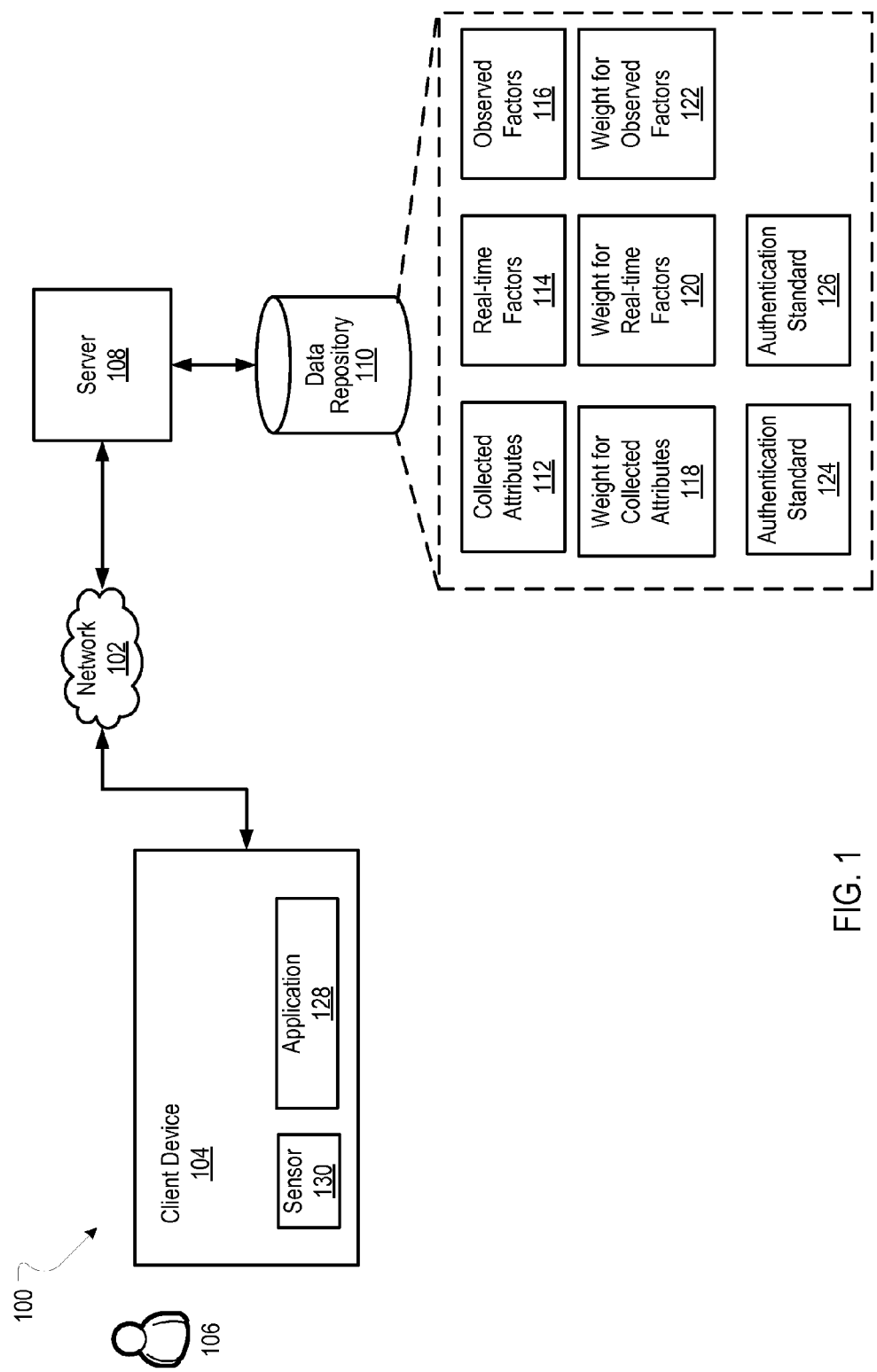
FIG. 1 is a diagrammatic view of a multifactor authentication system.

Referring now to FIG. 1, an example system 100 implementing a multifactor authentication service is shown. Multifactor authentication includes a process for authenticating a user of a system through the use of multiple factors (e.g., questions, properties of a user's geographic surrounding, properties of a user's mobile device, and so forth). System 100 includes a network 102, a client device 104, a server 108 and a is data repository 110. User 106 uses client device 104 desired to access a server 108 via the network 102. The Client device 104 and server 108 communicate with each other over network 102 and can run programs having a client-server relationship to each other.

Server 108 hosts various resources (not shown). A resource includes an item of data that is accessible from a network. There are various types of resources, including, e.g., HTML pages, web pages, web sites word processing documents, portable document format (PDF) documents, images, videos, applications, and so forth. Some of the resources hosted by server 108 are secure resources for which access is restricted to users that are authenticated by server 108 as having permission to access the secure resource.

To authenticate that a particular user 106 is authorized to access a resource, server 108 implements a dynamic, risk adjusted and weighted multifactor authentication process. The risk adjusted and weighted multifactor authentication process uses a combination of various authentication factors. An authentication factor includes a characteristic, quality or attribute that is used in verifying that a user is authorized to access a particular resource. As described in further detail below, authentication factors are either predefined and/or contextual in nature, and are used to confirm a user's identity. In one implementation, the server 108 selects questions that are based on selected authentication factors. Data repository 110 stores various questions and a mapping specifying a correspondence among the questions and the various authentication factors.

Various types of authentication factors, including, e.g., collected factors, real-time factors, observed factors, and so forth are provided. Collected factors include factors with values that server 108 has received from user 106, e.g., through client device 104. There are various types of collected factors, including, e.g., mother's maiden name, pet name, first school name, street name of first home, a location of where a user's mother was born, and so forth.

Referring to FIG. 2, listing 200 shows an example of various types of collected factors that are collected by server 108, e.g., via client device 104.

Referring now to FIG. 3 a graphical user interface 300 is populated with data generated by server 108. The graphical user interface 300 when rendered on client device 104 displays a listing of various collected factors 302, 304, 306, 308, 310 and provides fields for user 106 to enter values 312, 314, 316, 318, 320 for the collected factors 302, 304, 306, 308, 310 displayed in graphical user interface 300. Another type of authentication factor is a real-time factor. A real-time factor includes a characteristic, quality or attribute of a client device that is determined in real-time by server 108.

Figures 4, 5:
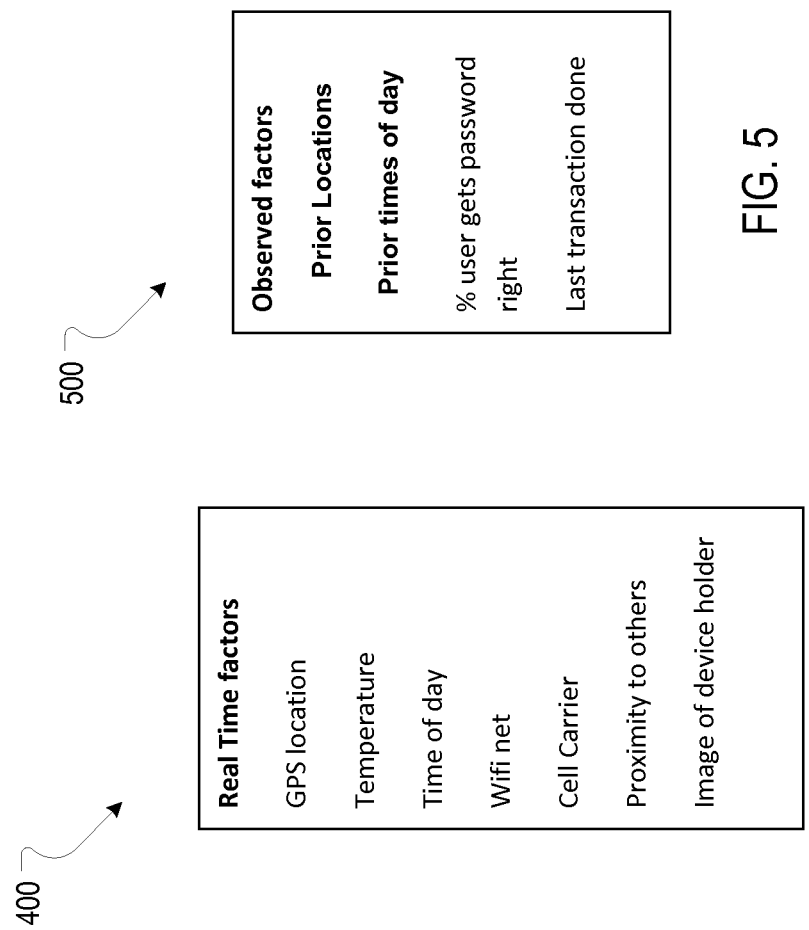

Referring to FIG. 4, an exemplary listing 400 of various types of real-time factors is shown The listing 400 includes, e.g., a global positioning system (GPS) location of client device 104, a temperature of a geographic area surrounding client device 104, a time of day in which client device 104 attempts to access the user's account, a wireless fidelity (Wi-Fi) network that is accessed by client device 104 and/or is accessible to client device 104, a cellular carrier that provides network access to client device 104, a proximity of client device 104 to other devices (e.g., a device that has been identified to server 108), an image of user 106 of client device 104 (e.g., detected by server 108 through facial recognition software on client device 104), and so forth.

Client device 104 includes sensor 130 and application 128 for transmitting, to server 108, information indicative of values of real-time factors. Sensor 130 includes one or more of a barometric sensor, an accelerometer, and so forth. Client device 104 accesses other devices (not shown) for transmitting, to server 108, information indicative of values of real-time factors. These other devices may include virtual glasses or goggles for transmitting, to server 108, information indicative of a geographic location surrounding client device 104.

Sensor 130 performs biometric verification (e.g., voice recognition, retina scan, DNA verification, fingerprint scanning, photograph or image of user, pulse rate, and so is forth). Sensor 130 and/or application 128 also collect physical characteristics of client device 104, including, e.g., client device angle, client device type, and so forth.

Sensor 130 and/or application 128 also collect environmental conditions of an area surrounding client device 104. There are various types of environmental conditions, including, e.g., humidity, temperature, and so forth.

Application 128 includes software and/or instructions for accessing geographic parameters of client device 104 (e.g., GPS data for client device 104), an identifier of a Wi-Fi network that is accessible to client device 104, an International Mobile Equipment Identity (IMEI) of client device 104, IMEIs of other devices in proximity to client device 104, a connection type that is accessible to client device 104 (e.g., a mobile cell carrier that provides connection and a wireless network that provides connections), and so forth.

As described in further detail below, server 108 uses various real-time factors in authenticating user 106. Based on the types of real-time factors that are used, server 108 determines which types of information to request from client device 104 (and/or sensor 130 and/or application 128). In an example, server 108 uses the real-time factor of temperature. Server 108 retrieves, from client device 104, temperature information, e.g., information specifying the temperature of the geographic location surrounding client device 104. In retrieving the temperature information, server 108 sends, to client device 104, a request for information specifying the temperature of the geographic location surrounding client device 104.

Using sensor 130 and/or application 128, client device 104 identifies the temperature of the geographic location surrounding client device 104.

Client device 104 transmits, to server 108, information specifying the temperature of the geographic location surrounding client device 104. Server 108 selects and/or generates a question based on the real-time factor of temperature. The question includes "what is the temperature in your area?" User 106 inputs an answer to the question into client device 104. In response, client device 104 transmits the answer to server 108. Server 108 compares the answer to the retrieved temperature information. If server 108 identifies a match between the answer and the retrieved temperature information retrieved, server 108 identifies that user 106 has correctly answered the question. If server 108 fails to identify a match between the answer and the retrieved temperature information, server 108 identifies that user 106 has incorrectly answered the question and adjusts an authentication standard accordingly, as described in further detail below.

Another type of authentication factor is an observed factor, which includes a characteristic, quality or attribute that is tracked (e.g., "observed") by server 108. The observed factor pertains to one or more of user 106, to client device 104, to an account of user 106 on server 108, and so forth. There are various types of observed factors.

Referring to FIG. 5, an exemplary listing 500 of types of observed factors is shown. This listing 500 includes, e.g., geographic locations from which user 106 has previously accessed a resource on server 108, times of day in which user 106 has previously accessed a resource on server 108, a number of times (or a percentage of times) that user 106 has correctly specified a password for a resource on server 108, and a prior transaction associated with user 106 and performed by server 108.

As described in further detail below, values of observed factors are used in adjusting an authentication standard. For example, server 108 uses a time of day observation factor in authenticating user 106. Server 108 tracks times of days in which user 106 accesses server 108. If user 106 accesses server 108 at midnight and user has not previously accessed server 108 at midnight, server 108 identifies this user behavior as potentially risky and increases an authentication standard accordingly.

In another example, server 108 uses a geographic location observation factor in authenticating user 106. Server 108 tracks geographic locations from which user 106 accesses server 108. If user 106 accesses server 108 from Mozambique and user has not previously accessed server from Mozambique, server 108 identifies this user behavior as potentially risky and increases an authentication standard accordingly.

Server 108 prompts user 106 (e.g., via a message sent to client device 104) for a selection of collected factors, real-time factors and observed factors to be used in authenticating user 106 to server 108 (and/or to a resource hosted by server 108). Server 108 stores, in data repository 110, the selected collected factors, real-time factors and observed factors, e.g., as collected factors 112, real-time factors 114 and observed factors 116. Collected factors 112, real-time factors 114 and observed factors 116 are associated with user 106, e.g. through an account or profile for user 106 that is also stored on data repository 110.

Server 108 also determines weights 118, 120, 122 to be applied to the values for collected factors 112, real-time factors 114 and observed factors 116, respectively. Using weights 118, 120, 122 and the values for collected factors 112, real-time factors 114 and observed factors 116, server 108 generates an authentication score for user 106, as described in further detail below.

There are various ways in which server 108 determines weights 118, 120, 122. In one example, server 108 assigns an authentication strength value to each of the various types of authentication factors, including, collected factors 112, real-time factors 114 and observed factors 116. An authentication strength value includes a value indicative of an effectiveness of an authentication factor in authenticating a user, relative to effectiveness of other authentication factors in authenticating a user.

There are various ways in which server 108 determines the authentication strength values for authentication factors. In an example, a user of server 108 assigns authentication strength values to collected factors 112, real-time factors 114 and observed factors 116. In another example, server 108 retrieves, from an external system (not shown), authentication strength values for various types of authentication factors.

Data repository 110 stores a mapping of authentication strength values to weighted values. Using the mapping, server 108 identifies weighted values that correspond to the authentication strength values for collected factors 112, real-time factors 114 and observed factors 116. Server 108 stores these identified weighted values as weights 118, 120, 122.

In another example, server 108 receives from user 106 information specifying values for weights 118, 120, 122 for collected factors 112, real-time factors 114 and observed factors 116, respectively. The user specifies values for weights 118, 120, 122, based on preferences of the user. In an example, the user 106 perceives observed factors 116 as being particularly strong authentication factors, e.g., relative to the perceived strength of other authentication factors. The user specifies an increased value for weight 122 for observed factors 116, relative to the values specified for weights 118, 120.

Figure 6:
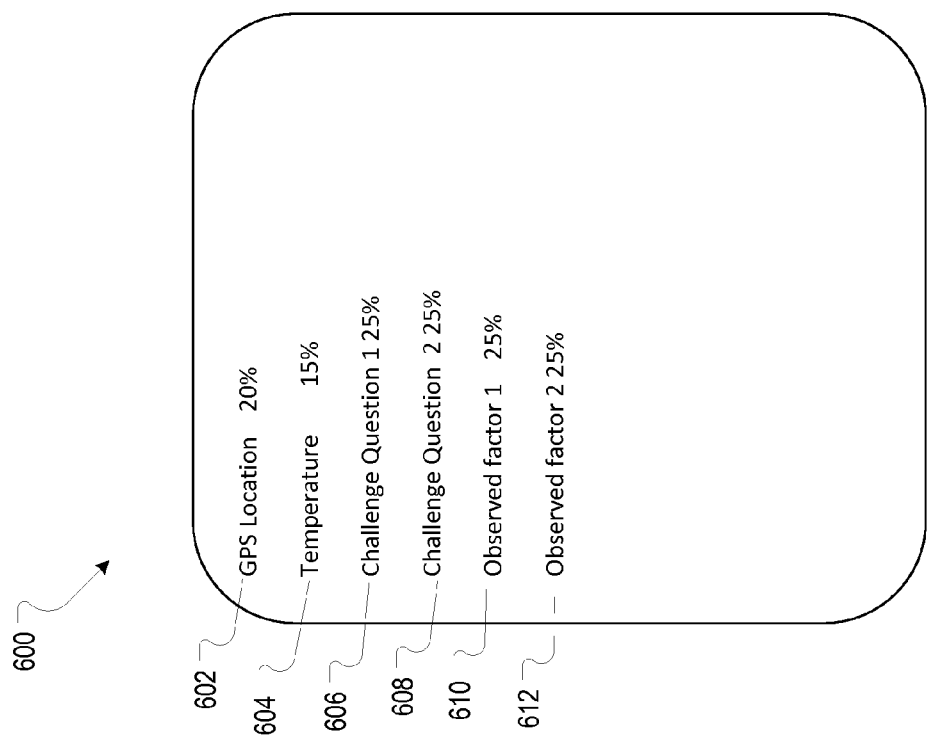

Referring to FIG. 6, graphical user interface 600 allows a user to specify weights for authentication factors 602, 604, 606, 608, 610, 612. Authentication factors 602, 604 are real-time factors. Authentication factors 606, 608 are collected factors. Authentication factors 610, 612 are observed factors. Server 108 provides user 106 with various interfaces for selecting which authentication factors to use (e.g., inclusion/exclusion of the various authentication factors) and to specify weights for the selected authentication factors. Using the selected authentication factors and specified weights, server 108 generates a profile for the user and stores the profile in data repository 110. The profile includes selected authentication factors and specified weights. Server 108 also associates the profile with identifying information of the user, e.g., to promote identification of the profile when the user accesses an account. In another example, rather than user 106 selecting authentication factors, server 108 selects (e.g., randomly) authentication factors to use in authenticating user 106.

Referring back to FIG. 1, server 108 also stores, in data repository 110, authentication standards 124, 126. An authentication standard is a threshold value for an authentication score. When an authentication score equals or exceeds the authentication standard, server 108 determines that a user associated with the authentication score is authenticated and authorized to access a resource for which the authentication score was determined. When an authentication score is less than the authentication standard, server 108 determines that a user associated with the authentication score is unauthorized to access a resource for which the authentication score was determined.

Server 108 also uses other techniques in determining whether a user is authorized to access a resource. Rather than using an authentication score, server 108 counts a number of times a user has incorrectly answered a question for an authentication factor. Server 108 accesses, from data repository 110, a threshold value specifying a number of incorrect answers that are allowed before the user is prevented from accessing the resource, e.g., for a limited period of time. When the number of incorrect answers exceeds the threshold value, server 108 prevents user 106 from accessing the account.

Server 108 adjusts a type of question being presented to the user, based on a number of questions the user has answered incorrectly. If the server 108 is providing the user with questions based on collected factors 112, the server 108 switches to provide the user with questions based on real-time factors or observed factors. These types of questions are associated with an increased perceived level of difficultly, relative to the perceived level of difficulty of other types of questions. For example, questions based on collected factors are perceived as being more difficult than questions based on real-time factors, or vice versa. The server 108 receives, from a device used by a user, information specifying the perceived level of difficulty of the various questions and/or authentication factors. If a user has incorrectly answered a threshold amount of questions, server 108 selects questions with an increased level of difficulty, relative to the level of difficulty of the questions previously presented to the user.

Server 108 adjusts an authentication standard, based on a number of questions the user has answered incorrectly. If a user has incorrectly answered a threshold amount of questions, server 108 increases the authentication standard, e.g., to prevent malicious users from accessing accounts and resources on server 108. Authentication standards are described in further detail below.

Server 108 implements various techniques in generating authentication standards 124, 126. In one embodiment, server 108 sets authentication standard 124 to a predefined value, including, a value of one-hundred. In this example, the values of the authorization factors are normalized to a scale of zero to one-hundred. For a user to be authenticated to access a resource, server 108 determines that an authentication score for the user exceeds the threshold value of one-hundred.

Server 108 adjusts values for authentication standards 124, 126, based on a level of risk associated with a user attempting to access a particular resource. When server 108 identifies an increased level of risk, server 108 requires a more stringent amount of authentication. As the level of risk increases, the value for the authentication standard also increases. When server 108 identifies a decreased level of risk, server 108 requires a less stringent amount of authentication. As the level of risk decreases, the value for the authentication standard also decreases.

Server 108 identifies a level of risk based on values of various authentication factors. In an example, server 108 uses values of collected factors in determining a level of risk. When a user correctly answers a question that is based on a collected factor (e.g., the question of "what is your mother's maiden name?"), server 108 determines a decreased level of risk, relative to a level of risk associated with an incorrect answer to the question. Based on the decreased level of risk, server 108 adjusts a value of an authentication standard downward.

Server 108 also uses real-time factors in identifying a level of risk. In an example, server 108 uses the real-time factor of proximity to other devices in identifying a level of risk. Through the real-time factor of proximity to other devices, user 106 verifies an identity of user 106. When user 106 selects the authentication factors to be is used in authentication, user 106 selects a real-time authentication factor based on proximity of client device 104 to other devices. In response to this selection, server 108 prompts user 106 for proximity information, e.g., information that is used in identifying the other devices and in identifying a proximity of client device 104 to the other devices. Server 108 lowers the authentication standard when user 106 is surrounded by devices, or clusters thereof, that are associated with the proximity information. The proximity information defines a location (a "safe location"), such as work or a home, by specifying subnet information of a network, a network name, a subnet name, and so forth.

When client device 104 requests that user 106 be authorized to access a resource hosted by server 108, the request includes subnet information identifying a subnet that is accessed by client device 104. Server 108 compares the subnet information to the proximity information. Based on a match between the subnet information and contents of the proximity information, server 108 determines that client device 104 is in proximity to a safe location and therefore determines that there is a decreased level of risk.

Server 108 also uses values for observed factors 116 in determining the level of risk. Server 108 tracks values for observed factors 116. When server 108 identifies a new value for an observed factor that differs from the tracked values, server 108 increases the level of risk. The amount by which the level of risk is increased is proportional to an amount by which the new value of the observed factor differs from the tracked values. As a disparity between the new value and the tracked values increases, the amount by which the level of risk is increased also increases.

One observed factor that is used in identifying the level of risk is the number of failed login attempts. For example, when using client device 104 outside of a normal geographic location (e.g., a tracked geographic location) for user 106, user 106 attempts to sign into a resource hosted on server 108. Server 108 tracks geographic locations from which user 106 accesses and/or logs into various resources hosted on server 108. Server 108 identifies the current geographic location of client device 104, when user 106 is attempting to sign into the resource. Based on a comparison of the current geographic location of client device 104 to the tracked geographic locations, server 108 identifies that user 106 has not previously signed into the resource from the current geographic location of client device 104.

Using results of the comparison, server 108 increases a level of risk associated with user 106 attempting to access the resource, relative to a level of risk associated with user 106 attempting to access the resource from a tracked geographic location. Based on the increased level of risk, server 108 adjusts authentication standard 124 by increasing a value for authentication standard 124. Data repository 110 stores a mapping of levels of risks to values for authentication standards. The mapping includes a sliding scale, in which the values of authentication standards increase as the levels of risk increase. Using the mapping with the sliding scale, server 108 identifies a value for authentication standard 124 that corresponds to the level of risk that is identified based on the comparison.

When server 108 identifies an increased level of risk, server 108 prompts user 106 to answer questions for additional, multiple authentication factors and/or prompts user 106 to authenticate via a higher weighted authentication factor (e.g., an authentication factor associated with an increased weighted value, relative to weighted values for other authentication factors).

When server 108 identifies an increased level of risk, server 108 also limits types of transactions that a user associated with the increased level of risk is authorized to perform. Server 108 hosts an account through which user 106 initiates various financial transactions, including, equity trades, money transfers, and so forth. In an example, a user is not using a mobile device usually used by the user. When the user attempts to access the user's account, server 108 detects that the user is not using the usual mobile device (e.g., the mobile device that is specified by tracked values in observed factors). Based on detecting that the user is not using the user's usual mobile device, server 108 restricts the types of transactions available to the user. For example, the user is allowed to initiate equity trades, but not money transfers, without first passing additional or more heavily weighted authentication factors, as riskier transactions require higher levels of authentication.

Server 108 also limits types of transactions using proximity, or lack thereof, to other devices. Server 108 implements a security feature that requires client device 104 to be in proximity to at least another device to initiate a particular transaction type, e.g., completing a transaction above a certain threshold amount, completing a transaction above an aggregate sum, and so forth.

In an example, server 108 determines a value limit on a transaction requested by client device 104 (e.g., client device requests performance of transaction with a value up to $250). Server 108 determines an increased value limit on a transaction requested by client device 104, e.g., when client device 104 is in proximity to another device specified by proximity information. For example, two mobile devices are owned by family members (e.g. spouses, a parent, a child and so forth). When one of the mobile devices sends a request to server 108 to perform a transaction, server 108 imposes a value limit on the transaction. The value limit is $250. When the same one of the mobile devices is in proximity to the other mobile device owned by the family member and sends a request to server 108 to perform a transaction, server 108 increases the limit value, e.g., based on proximity of the devices to each other. In this example, server 108 increases the value limit to $1000.

Server 108 implements this proximity based value limit feature to impose spending limits on children or spouses, or to insure that joint accounts cannot be used without mutual consent. Server 108 also implements this this proximity based value limit feature for large corporate transactions, e.g., where two executives are required to be in close proximity to each other to authorize a high value transaction or a sensitive transaction.

In addition to limiting types of transaction, server 108 also limits which authorization factors are used in the authorization process. Some authorization factors are available for particular gradient access levels, which are describe in further detail below. Some authorization factors are conditional authorization factors, which are available pending satisfaction of a condition, such as a user correctly answering questions based on other authorization factors.

Server 108 also identifies increased level of risk mid-transaction. In this example, mid-transaction risk is identified based on an aberration and/or abnormality from a previous history and/or pattern by trade type, by trade volume and/or trade amount, by user identified parameters (e.g., a limit on a transaction amount), and so forth. For example, server 108 identifies an increased level of risk when a user engages in short options, e.g., when previously the user has traded mutual funds. In another example, server 108 identifies an increased level of risk when a user stars day trading, when previous patterns indicate a buy and hold pattern. In still another example, server 108 identifies an increased level of risk when a user initiates trades with a larger transaction value (e.g., dollar amount) than are usual.

Server 108 implements a number of various applications, including, e.g., applications for performing financial transactions, social networking applications, and so forth. Each of the applications is associated with an authentication standard required to access it. The application displays for the user the authentication standard required to access it.

An application on server 108 has gradient levels of access. Gradient levels of access include tiered amounts of access, in which a user is granted increased levels of access as the amount of a user's authentication increases. There are various gradient levels of access, including, e.g., full access, limited access, no access, and so forth. Each of the gradient levels of access is associated with an authentication standard, with increased levels of access having higher authentication standards, relative to authentication standards for lower levels of access. The techniques described herein are used to provide risk adjusted and weighted multifactor authentication for the gradient levels of access.

For example, server 108 determines a level of risk each time a user requests to move from one gradient level of access to another gradient level of access. Based on the determined level of risk, an authentication standard is identified that is in accordance with the gradient level of risk. The authentication standard for a particular gradient level of access has an upper limit and a lower limit. Using the identified level of risk, server 108 adjusts the authentication standard to fall within the upper limit and the lower limit.

For a particular gradient level of access, server 108 prompts user 106 for weights for various authentication factors that are used for authentication for the gradient level of access. User 106 specifies different weights for the same authentication factors, when these authentication factors are used to provide authentication for different gradient levels of access. An application hosted by server 108 displays, for user 106, a level of access user 106 currently has with the application.

In a variation of FIG. 1, weights 118, 120, 122 are risk-adjusted. Server 108 adjusts values of weights 118, 120, 122 based on the determined level of risk. When server 108 detects an increase in a level of risk, server 108 increases the weights for one or more of collected factors 112, real-time factors 114 and observed factors 116 and/or decreases the weights for one or more of collected factors 112, real-time factors 114 and observed factors 116.

Server 108 risk-adjusts the values of weights 118, 120, 122, based on the authentication strength values of collected factors 112, real-time factors 114 and observed factors 116. When server 108 detects an increased level of risk, server 108 increases the value of weights for authentication factors with increased authentication strength values, e.g., relative to authentication strength values of other authentication factors. When server 108 detects an increased level of risk, server 108 also decreases the value of weights for authentication factors with decreased authentication strength values, e.g., relative to authentication strength values of other authentication factors. By increasing the value of weights for authentication factors with increased authentication strength values and decreasing the value of weights for authentication factors with decreased authentication strength values, server 108 causes the strong authentication factors to be weighted more heavily in computing the authentication score, as a way of dynamically adjusting the authentication processed based on the increased level of risk.

Server 108 implements a risk analysis engine, e.g., to perform the techniques described herein. In a variation of FIG. 1, the risk analysis engine is stored remotely, e.g., on a third party device, and server 108 accesses the risk analysis engine from the third party device. In this example, the risk analysis engine is stored as a cloud application. A cloud application is an application that is delivered as a service over a network (e.g., typically the Internet).

In a variation of FIG. 1, system 100 includes many thousands of data repositories, client devices, and servers, which are not shown. Although distinct modules are shown in the figures, in some examples, client and server programs can run on the same device.

Figure 7:
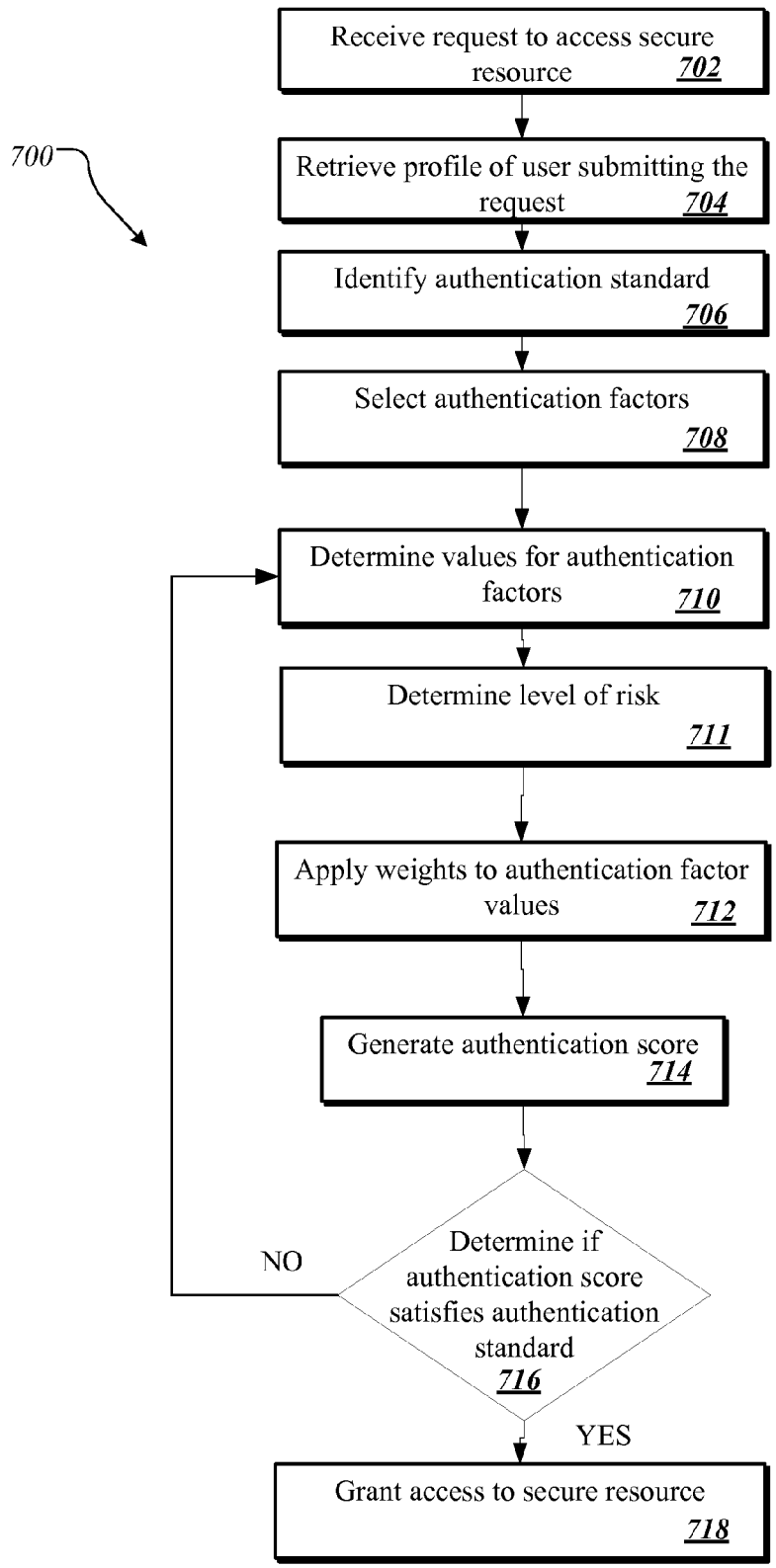
FIG. 7 is a flow chart useful in understanding the multifactor authentication system.

Referring to FIG. 7, server 108 implements process 700 in performing risk adjusted and weighted multifactor authentication. In operation, server 108 receives (702) a request to access a secure resource. The request is received from client device 104 and the secure resource is hosted by server 108.

The request also includes identifying information of a user initiating the request, e.g., such as a username and/or a password. Using the identifying information, server 108 retrieves (704) a profile, from data repository 110, for the user initiating the request. As previously described, the profile of a user includes information specifying types of authentication factors to be used in authentication the user, weights to be applied the specified types of authentication factors, and/or authentication standards to be used in authenticating the user.

The profile includes information specifying a default authentication standard. As previously described, the default authentication standard is adjusted, e.g., based on a user request for adjustment and/or based on server 108 detecting various adjustment criteria. Adjustment criteria include factors that cause the authentication standard to be modified.

As previously described, adjustment criteria include detection of incorrectly answered authentication questions (e.g., questions that are based on authentication factors).

Server 108 identifies (706) an authentication standard. Server 108 also selects (708) authentication factors, e.g., based on contents of the profile, based on a random selection technique, and so forth.

Server 108 determines (710) values ("determined values") for the selected authentication factors. In an example, the selected authentication factors are collected authentication factors. In this example, a user transmits, to server 108, determined values for the collected authentication factors, e.g., via the fields in graphical user interface 300 (FIG. 3). For selected authentication factors that are real-time factors, server 108 determines values for the real-time factors by retrieving, from client device 104, information specifying the values. For example, when the real-time factor is a temperature real-time factor, server 108 sends to client device 104 a request for the temperature of the area surrounding client device 104. In response, client device 104 sends to server 108 information specifying the temperature of the area surrounding client device 104. Server 108 assigns the received information to the temperature real-time factor, e.g., as a determined value for the real-time factor.

For selected authentication factors that are observed authentication factors, server 108 determines values for the observed authentication factors by retrieving, from data repository 110, information specifying values for the observed authentication factors, e.g., information specifying geographic locations from which the user has previously is accessed the user's account, information specifying times of day from which the user has accessed the user's account, and so forth.

Server 108 also determines current values for the selected authentication factors. Current values are the present values for the authentication factors. For example, current values are input by the user, are input to server 108 as part of the request to access a secure resource, are retrieved by server 108, and so forth. When a selected authentication factor is a collected factor or a real-time factor, server 108 retrieves a question associated with the collected factor or real-time factor and prompts the user to provide an answer to the question. The answer is the current value.

When a selected authentication factor is an observed factor, server 108 parses the request for authentication to identify information pertinent to the observed factor, e.g., information specifying a time of day of the request, information specifying a geographic location of the request, and so forth. This pertinent information is the current value for the observed factor.

When a selected authentication factor is an observed factor, server 108 also retrieves a current value, e.g., from client device 104. When the observed factor is for prior geographic locations from which the user has accessed the user's account, server 108 determines the current value by requesting that client device 104 send to server 108 information specifying the geographic location of client device 104. The information sent to server 108 is the current value for the observed factor. Server 108 retrieves the current value for the observed factor independent of input from the user, e.g., without prompting the user for a current value. Because server 108 retrieves the current value for the observed factor independent of input from the user, server 108 increases a level of authentication for accessing a resource, without increasing the amount of user input and without increasing the amount of inconvenience to the user. Server 108 increases an amount of security and authorization required to access a resource without additional user input.

Server 108 compares the determined values to the current values. Based on the comparison, server 108 determines (711) a level of risk, as previously described. Based on the determined level of risk, server adjusts the authentication standard. As previously described, server 108 adjusts the level of risk based on current values for the observed factors. For example, the determined values for an observed factor specify that 90% of time the user logs into the user's account from Boston, Mass. If a current value indicates that the user is attempting to access the user's account from Mozambique, server 108 detects an increased level of risk, e.g., based on the disparity between the determined values and the current value. Server 108 increases the authentication standard accordingly. By adjusting the authentication standard based on the observed factors, server 108 adjusts the authentication standard independent of information input by the user into server 108. Server 108 promotes an adjustment of an amount of authentication without additional inconvenience to the user and without additional input required from the user.

Based on the comparison, server 108 also determines which authentication factors to be used in computing the authentication score, including e.g., authentication factors associated with questions that the user has correctly answered and/or with current values that correspond to the determined values for the authentication factors. Authentication factors associated with questions that the user has incorrectly answered and/or with current values that fail to correspond to the determined values are excluded from the computation.

For the authentication factors that are included in the computation, server 108 applies (712) weights to the included authentication factors. Based on application of the weights to the included authentication factors, server 108 generates (714) an authentication score. Based on a comparison of the authentication score to the authentication standard, server 108 determines (716) if the authentication score satisfies the authentication standard. If the authentication score is less than the authentication standard, the authentication score fails to satisfy the authentication standard and server 108 repeats actions 710, 712, 714, 716. If the authentication score is greater than the authentication standard, the authentication score satisfies the authentication standard and server 108 grants (718) the user access to the secure resource.

Figure 8:
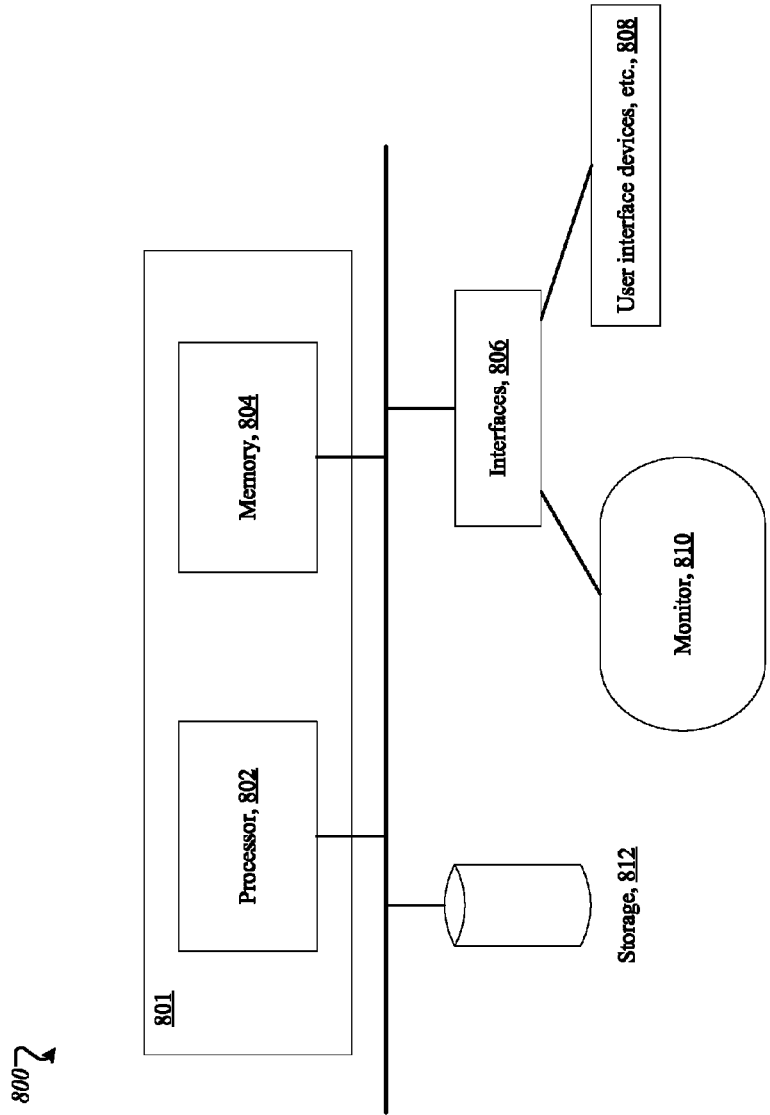
FIG. 8 is a block diagram of typical components for devices in the system of FIG. 1.

FIG. 8 shows details of components of device 801 used in the multifactor authentication system 100. In an example, device 801 includes a client device (e.g., client device 104). In another example, device 801 includes a server (e.g., server 108). Systems, servers and client devices will typically include a processor 802, memory 804, interfaces 806, storage 812, monitor 810, and user interface devices 808 such as a mouse, etc.

Device 801 can be any sort of computing device capable of taking input from a user and communicating over a network (not shown) with server 108 and/or with other client devices. For example, user devices can be a mobile device, a desktop computer, a laptop, a cell phone, a personal digital assistant ("PDA"), a server, an embedded computing system, a mobile device, a key fob device, and so forth. Client devices can include a monitor that renders visual representations.

Device 801 can also be a server, a distributed computing system, a rack-mounted server, and so forth. Device 801 may be a single server or a group of servers that are at a same location or at different locations.

Device 801 can receive information from a client device, including, e.g., graphical user interfaces. Interfaces 806 can be any type of interface capable of receiving information over a network, such as an Ethernet interface, a wireless networking interface, a fiber-optic networking interface, a modem, and so forth.

Device 801 also includes a processor 802 and memory 804. A bus system (not referenced) can be used to establish and to control data communication.

Processor 802 may include one or more microprocessors. Generally, processor 802 may include any appropriate processor and/or logic that is capable of receiving and storing data, and of communicating over a network (not shown). Memory 804 can include a hard drive and a random access memory storage device, such as a dynamic random access memory, machine-readable media, or other types of non-transitory machine-readable storage devices. Components 800 also include storage device 812, which is configured to store information collected through the brokerage system during a physician's consultation with a patient, as well as an operating system and application software.

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:

1. A computer-implemented method comprising:
receiving, from a device used by a user, a request to access a resource hosted by a computer system;
identifying, by the computer system, a level of risk associated with the user requesting access to the resource;
adjusting, by the computer system, an authentication standard for access to the resource, adjusting based on the identified level of risk;
determining values for authentication factors used in authenticating the user's access to the resource;
applying weights to the values for the authentication factors, with a weight specifying an effectiveness of one authentication factor in authenticating the user relative to effectiveness of other authentication factors in authenticating the user;
generating, based on the weighted values, an authentication score; and
determining whether the authentication score equals or exceeds the adjusted authentication standard, in order to authenticate the user as authorized to access the resource.

2. The method of claim 1, further comprising:
receiving, from the device used by the user, information specifying a selection of the authentication factors.

3. The method of claim 1, further comprising:
receiving, from the device used by the user, information specifying the weights to be applied to the authentication factors.

4. The method of claim 1, wherein the authentication factor comprises one or more of a collected factor, a real-time factor, and an observed factor.

5. The method of claim 1, wherein one of the authentication factors is an observed factor, and wherein the method further comprises:

transmitting, to the device, a request for information specifying a current value of the observed factor; and
receiving, from the device, the information specifying a current value of the observed factor.

6. The method of claim 5, further comprising:
retrieving, from a data repository, information collected based on the user's prior accessing of the resource;
identifying, in the retrieved information, a value for the observed factor; and
comparing the identified value of the observed factor to the current value of the observed factor;
wherein identifying the level of risk associated with the user requesting access to the resource comprises:
identifying, based on comparing the identified value of the observed factor to the current value of the observed factor, the level of risk associated with the user requesting access to the resource.

7. The method of claim 1, wherein one of the authentication factors is an observed factor, wherein the observed factor promotes an increase in a level of authentication, relative to a level of authentication provided without the observed factor, that is independent of user input.

8. A computer program product tangibly stored on a computer readable storage device, the computer program product comprising instructions for causing a computer system to:
receive, from a device used by a user, a request to access a resource hosted by the computer system;
identify a level of risk associated with the user requesting access to the resource;
adjust an authentication standard for access to the resource, adjusting based on the identified level of risk;
determine values for authentication factors used in authenticating the user's access to the resource;
apply weights to the values for the authentication factors, with a weight specifying an effectiveness of one authentication factor in authenticating the user relative to effectiveness of other authentication factors in authenticating the user;
generate, based on the weighted values, an authentication score; and
determine whether the authentication score equals or exceeds the adjusted authentication standard, in order to authenticate the user as authorized to access the resource.

9. The computer program product of claim 8, further comprising instructions for causing the computer system to:
receive, from the device used by the user, information specifying a selection of the authentication factors.

10. The computer program product of claim 8, further comprising instructions for causing the computer system to:
receive, from the device used by the user, information specifying the weights to be applied to the authentication factors.

11. The computer program product of claim 8, wherein the authentication factor comprises one or more of a collected factor, a real-time factor, and an observed factor.

12. The computer program product of claim 8, wherein one of the authentication factors is an observed factor, and wherein the computer program product further comprises instructions for causing the computer system to:
transmit, to the device, a request for information specifying a current value of the observed factor; and
receive, from the device, the information specifying a current value of the observed factor.

13. The computer program product of claim 12, further comprising instructions for causing the computer system to:

retrieve, from a data repository, information collected based on the user's prior accessing of the resource;

identify, in the retrieved information, a value for the observed factor; and compare the identified value of the observed factor to the current value of the observed factor;

wherein instructions for causing the computer system to identify the level of risk associated with the user requesting access to the resource comprises instructions for causing the computer system to:

identify, based on comparing the identified value of the observed factor to the current value of the observed factor, the level of risk associated with the user requesting access to the resource.

14. The computer program product of claim 8, wherein one of the authentication factors is an observed factor, wherein the observed factor promotes an increase in a level of authentication, relative to a level of authentication provided without the observed factor, that is independent of user input.

15. An apparatus comprising:

a processor; and a computer program product stored on a computer readable medium, the computer program product comprising instructions for causing the processor to:

receive, from a device used by a user, a request to access a resource hosted by a computer system;

identify a level of risk associated with the user requesting access to the resource;

adjust an authentication standard for access to the resource, adjusting based on the identified level of risk;

determine values for authentication factors used in authenticating the user's access to the resource;

apply weights to the values for the authentication factors, with a weight specifying an effectiveness of one authentication factor in authenticating the user relative to effectiveness of other authentication factors in authenticating the user; and generate, based on the weighted values, an authentication score; and determine whether the authentication score equals or exceeds the adjusted authentication standard, in order to authenticate the user as authorized to access the resource.

16. The apparatus of claim 15, wherein the computer program product further comprises instructions for causing the processor to:

receive, from the device used by the user, information specifying a selection of the authentication factors.

17. The apparatus of claim 15, wherein the computer program product further comprises instructions for causing the processor to:

receive, from the device used by the user, information specifying the weights to be applied to the authentication factors.

18. The apparatus of claim 15, wherein the authentication factor comprises one or more of a collected factor, a real-time factor, and an observed factor.

19. The apparatus of claim 15, wherein one of the authentication factors is an observed factor, and wherein the computer program product further comprises instructions for causing the processor to:

transmit, to the device, a request for information specifying a current value of the observed factor; and receive, from the device, the information specifying a current value of the observed factor.

20. The apparatus of claim 19, wherein the computer program product further comprises instructions for causing the processor to:

retrieve, from a data repository, information collected based on the user's prior accessing of the resource;

identify, in the retrieved information, a value for the observed factor; and compare the identified value of the observed factor to the current value of the observed factor;

wherein instructions for causing the processor to identify the level of risk associated with the user requesting access to the resource comprises instructions for causing the processor to:

identify, based on comparing the identified value of the observed factor to the current value of the observed factor, the level of risk associated with the user requesting access to the resource.

\* \* \* \* \*